United States Patent [19]

Wada et al.

[11] Patent Number: 5,650,051

[45] Date of Patent: Jul. 22, 1997

[54] HYDROGEN GENERATING METHOD USING GAMMA RAYS

[75] Inventors: Yukio Wada, Mito; Munetaka Myochin, Hitachinaka; Kouichi Kawaguchi, Naka-gun; Kazunari Domen, Sagamihara, all of Japan

[73] Assignee: Doryokuro Kakunenryo Kaihatsu Jigyodan, Tokyo, Japan

[21] Appl. No.: 579,905

[22] Filed: Dec. 28, 1995

[30] Foreign Application Priority Data

Dec. 28, 1994 [JP] Japan .................................. 6-326818

[51] Int. Cl.$^6$ ........................................ B01J 19/08
[52] U.S. Cl. ........................................ 204/157.52
[58] Field of Search ........................... 204/157.52, 157.4

[56] References Cited

U.S. PATENT DOCUMENTS

| | | | |
|---|---|---|---|
| 4,484,992 | 11/1984 | Buhler et al. | 204/157.52 |
| 4,623,437 | 11/1986 | Visca et al. | 204/157.52 |
| 4,637,867 | 1/1987 | Herbst, Jr. | 204/157.52 |
| 4,889,604 | 12/1989 | Khan et al. | 204/157.52 |
| 5,262,023 | 11/1993 | Sayama et al. | 204/157.52 |

FOREIGN PATENT DOCUMENTS 2-954440  4/1990  Japan .

Primary Examiner—Kathryn L. Gorgos
Assistant Examiner—Kishor Mayekar
Attorney, Agent, or Firm—Fish & Richardson PC

[57] ABSTRACT

Gamma rays are applied to a suspension which includes water and a catalyst having an element of platinum group metal carried on a semiconductor, thereby decomposing the water so as to produce hydrogen. The energy of gamma rays emitted from a nuclear reactor can be utilized to achieve a high-efficient generation of hydrogen.

6 Claims, 7 Drawing Sheets

SCHEME OF PHOTOCATALYTIC ACTION BY SEMICONDUCTOR PARTICULATES

PROCEDURE FOR PREPARING TiO2 CATALYST CARRYING Ru

TiO$_2$ CATALYST CARRYING Ru

— 50 mm

STRUCTURE OF DEVICE FOR COLLECTING
HYDROGEN GENERATED WITH GAMMA RAYS

HYDROGEN GENERATING METHOD USING GAMMA RAYS

BACKGROUND OF THE INVENTION

The present invention relates generally to a method for generating hydrogen by decomposing water.

Hydrogen has been hitherto produced through the electrolysis of water. This producing process does necessitate valuable electric energy in order to electrolyze water. Concurrently, the research is developed for techniques producing hydrogen with semiconductor particulates. In the process using semiconductor particulates, as shown in FIG. 1, an element Pd of platinum group metal is carried on a semiconductor particulate 101 such as $TiO_2$, which is then introduced into water 102. Exposure of the water 102 to sunlight 103 causes electrons 105 within a valence band 104 to excite over an energy gap to a conduction band 106, thereby generating positive holes 107 in the valence band 104. The electrons excited to the conduction band 106 reduce protons $H^+$ in the water 102 to hydrogen atoms H. Two hydrogen atoms join together to make a hydrogen molecule $H_2$. The positive holes 107 remaining in the valence band 104 deprive water $H_2O$ or hydroxide ion $OH^-$ of electrons, generating oxygen or protons. Organic substances in water, if present, are also oxidized. The element Pd of platinum group metal functions to promote oxidation/reduction reaction.

The above-described process, however, possibly produces a very small amount of hydrogen irrespective of a vast sun exposure area because of its lower sunlight transmittance and lower light energy harnessing efficiency. Further, this hydrogen producing process cannot work during night or in rain. Under such circumstances, an alternative process has been sought for producing hydrogen.

For instance, Japanese Patent Laid-open Pub. No. Hei 2-595440 (1990) discloses a hydrogen producing process producing hydrogen using a catalyst such as a radioactive element of platinum group metal generated in a nuclear reactor. In this hydrogen producing process, as shown in FIG. 2B, a radioactive element 110 of platinum group metal such as Ru-106 is carried on a semiconductor particulate 111. When the semiconductor particulate 111 is introduced into water, radiation hµ originating from the radioactive element 110 of platinum group metal causes electrons 113 within a valence band 112 to excite over the energy gap. The excitation of the electrons 113 makes it possible to produce hydrogen in the same manner as the above-described process. The hydrogen producing process utilizing a radiation has the following advantages: (a) capable of realizing mass production of electron/positive hole pairs; (b) allowing a substance of a larger band gap to be the semiconductor particulate; (c) capable of increasing the particulate concentration in a water/catalyst medium; and (d) providing a way of utilizing a radioactive waste of a higher radioactivity level.

The hydrogen producing process in which a radioactive element of platinum group metal is carried on a semiconductor particulate, however, requires crushing and mixing the element of platinum group metal when carrying the element on the semiconductor, resulting in additional steps dealing with a high-radioactive substance which is difficult to handle. In addition, the radioactive substances have to be selected from radioactive elements of platinum group metal, since the substances used in this process is also required to act as a catalyst for oxidation/reduction reaction. This fact makes it impossible to provide the other radioactive substances with useful application.

SUMMARY OF THE INVENTION

It is therefore an object of the present invention to provide a hydrogen producing process capable of utilizing radiation energy emitted from a nuclear reactor as well as of utilizing a wide variety of radioactive substances.

The first aspect of the present invention provides a method for generating hydrogen, comprising providing aqueous suspension containing particles comprising a platinum group metal, and irradiating the suspension with gamma radiation to decompose water in the suspension.

According to the second aspect of the invention, the particles further comprising at least one semiconductor material. Preferably, the platinum group metal is carried on the semiconductor, thereby providing a catalyst.

According to the third aspect of the invention, the element of platinum group metal comprises at least one element selected from a group consisting of Ru, Rh and Pd.

With a method according to the present invention, the irradiation of a catalyst 10 with gamma rays 11 causes, as shown in FIG. 2B, electrons 13 within a valence band 12 to excite over an energy gap to a conduction band 14, thereby generating positive holes in the valence band 12. The electrons 13 excited toward the conduction band 14 reduce protons up to hydrogen molecules $H_2$, while the positive holes remaining in the valence band 12 deprive water $H_2O$ or hydroxide ions $OH^-$ of electrons, thereby producing oxygen or protons.

Although palladium Pd is illustrated representative of elements of platinum group metal in FIG. 2A, any element in addition to the palladium Pd can be applied to the present invention for providing a catalyst action. Further, any semiconductor particulates in addition to titanium oxide particulates may be applied to the invention for covering a predetermined energy gap. For instance, as depicted in FIG. 3, semiconductors belonging to TYPE1 cover redox potentials from hydrogen to proton as well as from water to oxygen. Semiconductors of TYPE2 cover a redox potential from hydrogen to proton. And in TYPE3 only a redox potential from water to oxygen can be covered. The TYPE1 semiconductors are above all most effective for use in the present invention. More specifically, any element may be applied to the invention when it has an energy gap capable of exciting electrons from a valence band to a conduction band by an energy of gamma rays and it covers redox potentials both from hydrogen to proton and from water to oxygen.

BRIEF DESCRIPTION OF THE DRAWINGS

Other and further objects, features and advantages of the present invention will become apparent from the following detailed description of the preferred embodiments taken in conjunction with the accompanying drawings wherein.

DESCRIPTION OF THE PREFERRED EMBODIMENT

The present invention will now be described by way of a preferred embodiment with reference to the accompanying drawings.

Principles are first explained of a water decomposing process and a hydrogen generating process, which are based on a radiation/semiconductor catalysis according to the present invention.

The water decomposition process and the hydrogen producing process of the present invention include two mechanisms of reactions. The first one is to be referred to as a "semiconductor particulate suspension process". For this process catalysts are prepared to include semiconductor particulates (preferably, several microns to several ten microns in diameter) such as $TiO_2$, $SrTiO_3$, and the like whose surfaces carry an element of platinum group metal such as Ru. A large quantity of catalysts are suspended in water to provide a suspension. Irradiating the suspension to gamma rays causes the generation of electron/positive hole pairs ($e^-$–$h^+$) within the semiconductor, which in turn decompose water to generate hydrogen and oxygen. In the ($e^-$–$h^+$) pair, $e^-$ acts to reduce proton so as to generate hydrogen, while $h^+$ acts to oxidize water so as to generate oxygen.

The second mechanism is to be referred to as a "platinum group metal particulate suspension process". In this process, a suspension are prepared in which particulates (preferably, several to several ten micron in diameter) of Ru metal are suspended in water. When the suspension is exposed to gamma rays, a reaction of the gamma rays with water $H_2O$ generates hydrogen radicals (H—) and hydroxyl radicals (—OH). The same kind of radicals easily recombine with each other on the surfaces of the metallic particulates by the action of a catalysis of the metallic particulate, resulting in the generation of $H_2$ and $H_2O_2$. The efficiency of this reaction is surprising capable of reaching about thirty times the efficiency in the absence of the metallic particulates.

Figure 4:
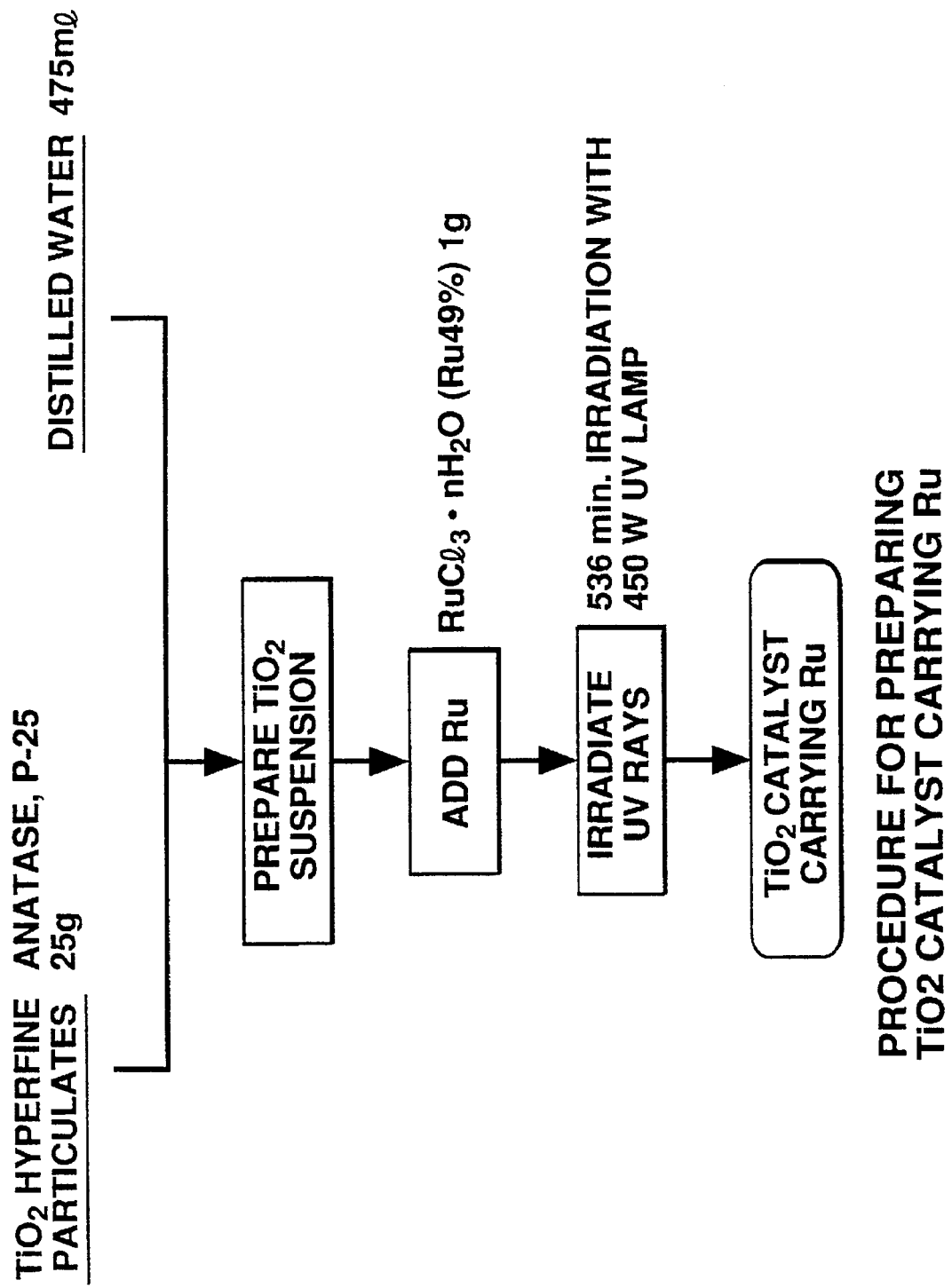
FIG. 4 is a diagram explaining a process carrying an element of platinum group metal on semiconductor particulates.
Figure 5:
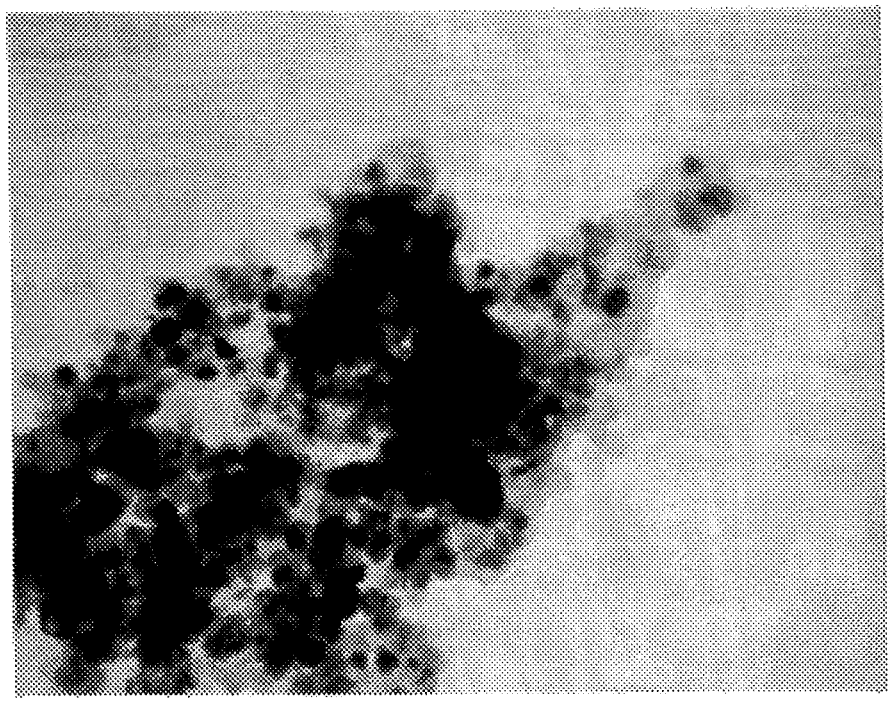
FIG. 5 is a photograph showing an enlarged view of titanium oxide catalyst carrying ruthenium Ru.

In order to realize the above described "semiconductor particulate suspension process", it is necessary to have the surface of semiconductor particulates carry an element of platinum group metal. As shown in FIG. 4, for instance, 25 g anatase is suspended in distilled water of 475 ml so as to prepare a $TiO_2$ suspension. 1 g of $RuCl_3$-$nH_2O$ (49% of Ru) as elements of platinum group metal is added to the suspension. The ruthenium Ru added suspension is exposed to, e.g., UV rays of 450 watt for 536 minutes, whereupon ruthenium carrying titanium oxide catalyst can be obtained as a catalyst which carries platinum group metal element thereon. Although $TiO_2$ is used as a semiconductor particulate in this embodiment, other semiconductors such as $SrTiO_3$ may also be applied to the present invention as previously mentioned. The catalyst obtained through such process is shown in FIG. 5 in an enlarged scale.

Figure 6:
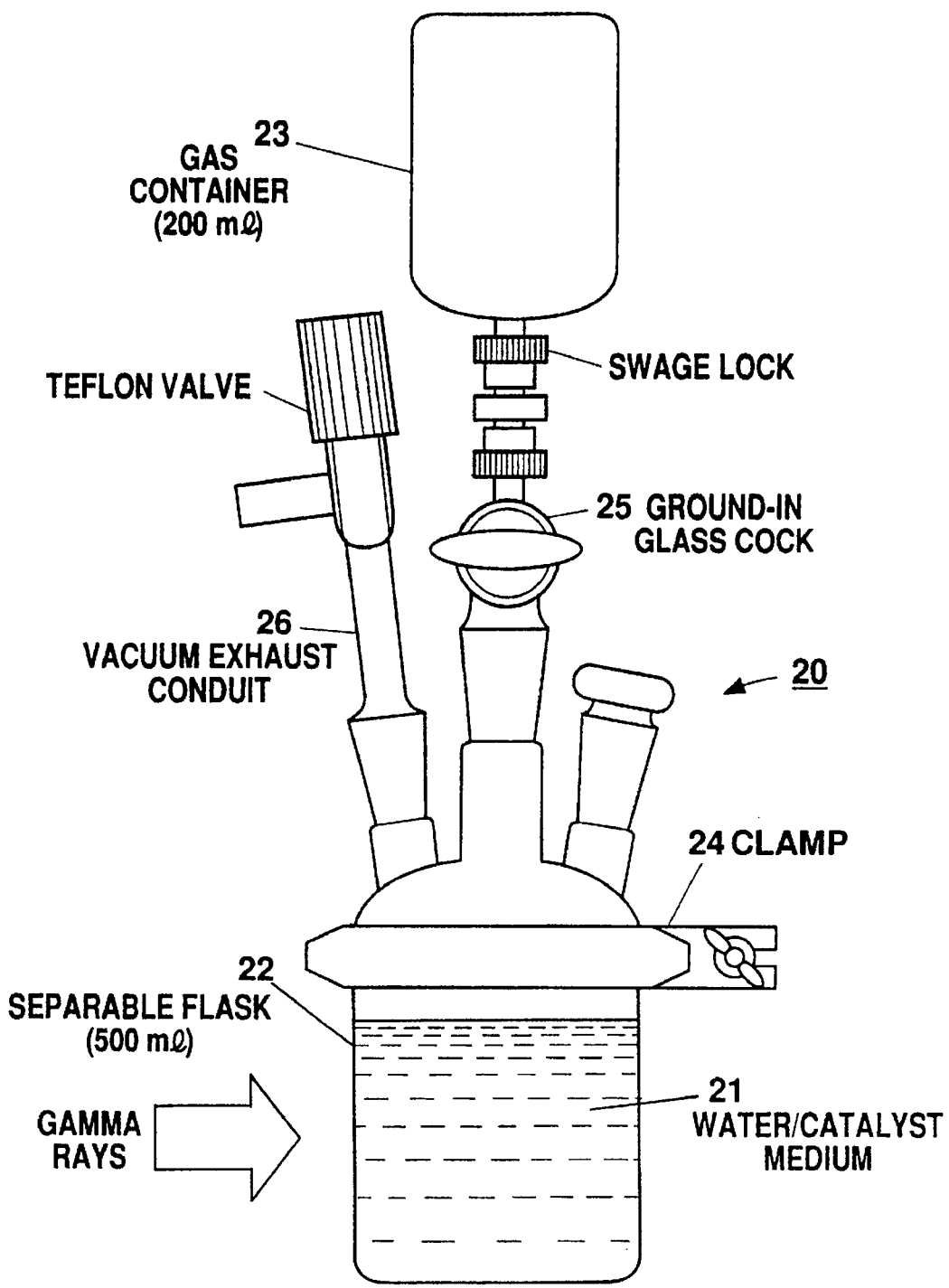
FIG. 6 illustrates a hydrogen collecting device used in an experiment for measuring a hydrogen quantity.

The generation of hydrogen from thus obtained suspension has been observed by using a hydrogen collecting device depicted in FIG. 6. As is illustrated in FIG. 6, the hydrogen collecting device 20 comprises a separable flask 22 of, e.g., 500 ml for containing the suspension 21, and a gas container 23 of, e.g., 200 ml cooperating with the flask 22 so as to collect hydrogen generated from an exposure to gamma rays. The flask 22 is coupled to the gas container 23 via a clamp 24. The communication can be controlled by a ground-in glass cock 25 between the interiors of the flask 22 and the gas container 23. The clamp 24 is provided with a vacuum exhaust conduit 26 for evacuating gas within the interior of the flask 22.

The suspension 21 is first reserved in the flask 22, from which gas is temporarily evacuated through the vacuum exhaust conduit 26 connected to the flask 22. The gas is replaced with argon gas in the flask 22. Gamma rays are then applied to the suspension 21 in the flask 22 so as to generate hydrogen. After the ground-in glass cock 25 is opened, the volume of the whole gas and the proportion of particular kind of gases collected in the gas container 23 are measured to observe the quantities (volumes and proportions) of the particular gases excluding the argon gas. In this experiment, $^{60}Co$ 43000Ci radiation source was placed 20 cm apart from the hydrogen collecting device 20. TABLE1 below shows the results.

TABLE 1

The Results of Water Decomposing/Hydrogen Generating Experiment With $^{60}Co$ Gamma Irradiation

| Irradiated Samples | Sample Weight gram Particles/water | $H_2$ Generation Rate ml/hour | Gamma Rays Irradiation Dose |
|---|---|---|---|
| 1 $TiO_2$ Carrying Ru | 25/500 | 7.88 | $1 \times 10^6$ R/hr 3 hours |
| 2 $TiO_2$ Carrying Ru | 25/500 | 0.0026 | 0 |
| 3 $TiO_2$ + MeOH Carrying Ru | 25/500 + 50 ml | 70.18 | $1 \times 10^6$ R/hr 3 hours |
| 4 Ru Metallic Particles | 10/500 | 3.90 | $1 \times 10^6$ R/hr 3 hours |
| 5 $H_2O$ | 0/500 | 0.18, 0.10 (average 0.14) | $1 \times 10^6$ R/hr 3 hours |

From the comparison between the RESULT1 and RESULT2, it can be understood that a great quantity of hydrogen can be reliably generated by the irradiation, with gamma rays, of the suspension containing titanium oxide catalyst carrier carrying ruthenium Ru. The quantity of hydrogen thus generated reaches approximately 60 times the one obtained in the RESULT5 in which gamma rays were radiated onto water containing no catalyst. Moreover, as is apparent from the RESULT3, the addition of methanol MeOH to the suspension ensures the generation of a still larger volume of hydrogen, namely, 500 times the quantity of RESULT5. The RESULT4 tells that even mere addition of ruthenium Ru particles can cause the order of 30 times more hydrogen to be generated. The comparison between the RESULT1 and RESULT4 reveals that the presence of semiconductor particulates can accelerate the generation of hydrogen.

Figure 7:
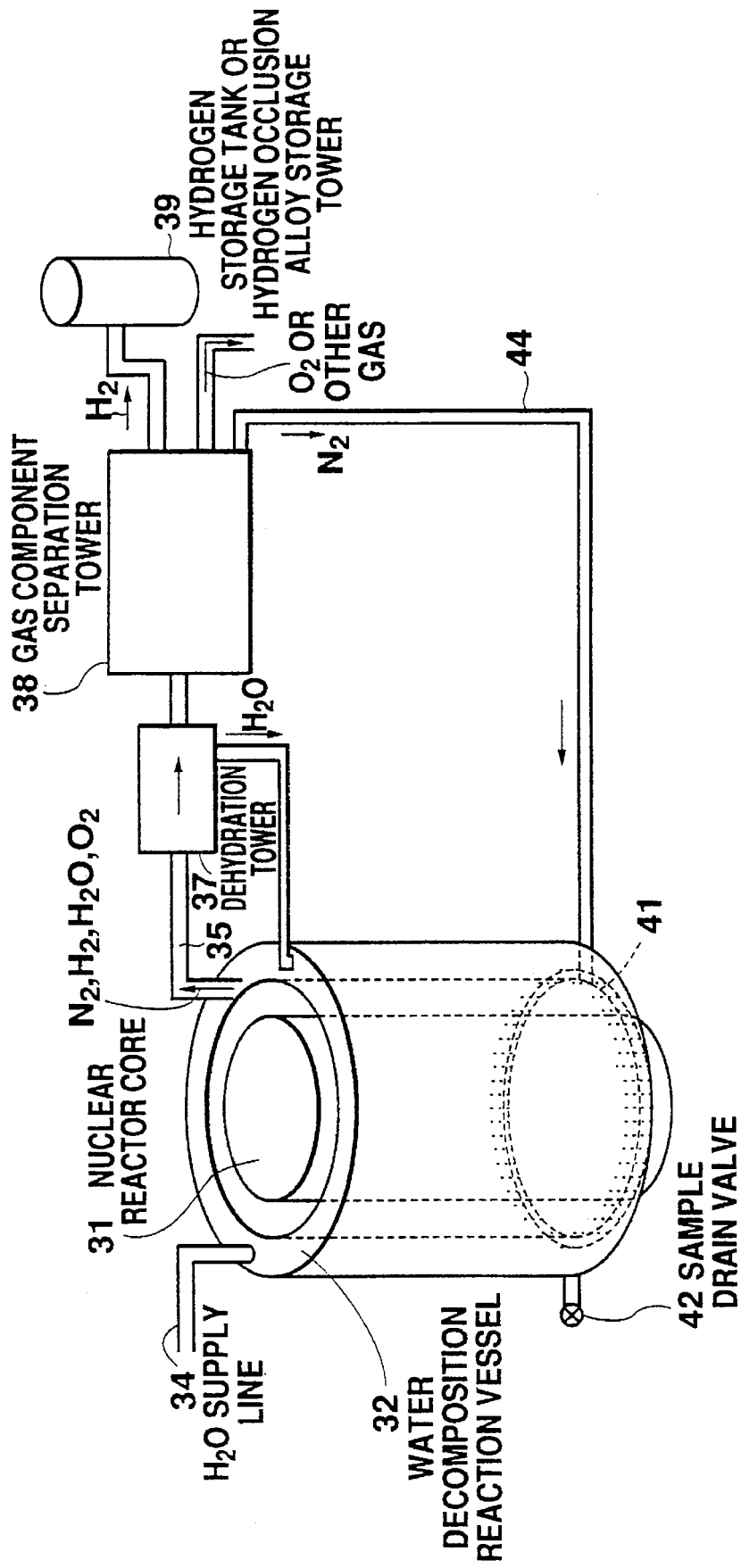
FIG. 7 illustrates an in-reactor hydrogen generating system employing the process of the present invention.

FIG. 7 illustrates an arrangement of an in-reactor hydrogen generating system in accordance with the water decomposing process and hydrogen generating process of the present invention. The in-reactor hydrogen generating system of this embodiment comprises a water decomposition reaction vessel 32 of a hollow cylinder surrounding a reactor core 31. The water decomposition reaction vessel 32 serves as a reaction vessel for suspending in water $TiO_2$ particulates whose surfaces carry platinum group metal elements such as ruthenium Ru. It is to be noted that this suspension may include independent platinum group metal particulates (preferably, up to several ten microns) such as Ru metallic particulates. The water decomposition reaction vessel 32 in this embodiment has an inner diameter of 300 cm, outer diameter of 350 cm, height of 400 cm, and internal volume of 40 $m^3$.

Water is supplied via an H₂O supply line 34 to the water decomposition reaction vessel 32. Water can be appropriately replenished through the H₂O supply line 34 by the amount consumed by the water decomposition. Gas generated in the water decomposition reaction vessel 32 is transferred through a gas collection pipe 35 to a dehydration tower 37. The dehydration tower 37 serves to dehydrate the gas flowing through the gas collection pipe 35. The resultant water is returned to the water decomposition reaction vessel 32.

In a gas component separation tower 38, hydrogen, oxygen, both derived from oxygen/reduction reaction, and nitrogen used as a purge gas are separated. The gas component separation tower 38 employs gas chromatography, gas separation membrane, or the like. Thus separated hydrogen is stored in a hydrogen storage tank 39, which may be constituted of an ordinary gas tank or a hydrogen occlusion alloy storage tower.

The purge gas circulates in a gas purge circulation system 44. Nitrogen separated at the gas component separation tower 38 flows through the gas purge circulation system 44 and spouts out from pores of an annular tube 41, which is disposed at the bottom of the water decomposition reaction vessel 32. The purge gas serves not only to provide a carrier for the generated hydrogen but also to stir the suspension so as to prevent aggregation of the suspension.

A sample drain valve 42 is connected to the water decomposition reaction vessel 32. Through the sample drain valve 42, if necessary, a sample in the vessel 32 can be replaced.

Based on the results of TABLE1, calculation will now be made of the quantity of hydrogen generated within the in-reactor hydrogen generating system. It was assumed from the results of TABLE1 that hydrogen is generated at rate of 8 ml/hr for 500 ml suspension.

The calculation reveals that, in the reaction vessel of 40 m³, hydrogen is generated at 65 m³ H₂/hr under the condition where gamma ray effective dose rate from the reactor core 31 is $1\times10^8$ R/hr, and at 650 m³ H₂/hr with $1\times10^9$ R/hr. The generation rate of the latter reach about half of a hydrogen generation rate of 1330 Nm³/hr planned in the research on high temperature gas-cooled reactors (Atomic Energy Society of Japan, Proc. Vol. 35, No. 5, 1993).

According to the in-reactor hydrogen generating system of this embodiment, the generation of such a large amount of hydrogen can be obtained while simultaneously maintaining ordinary nuclear power generation.

Should the nuclear reactor come to an emergency stop, gamma ray field abruptly disappears, resulting in extremely suppressed generation of hydrogen. This means that the control of deenergizing the nuclear reactor allows an automatic control of the generation of hydrogen. Naturally, in case liquid is drained from the water decomposition reaction vessel, the energization of the reactor bring about no generation of hydrogen. Moreover, the in-reactor hydrogen generating system of the present invention prevents any leakage of radiation emanating from the reactor, thereby making it possible to shield the reactor while simultaneously producing hydrogen.

Figure 1:
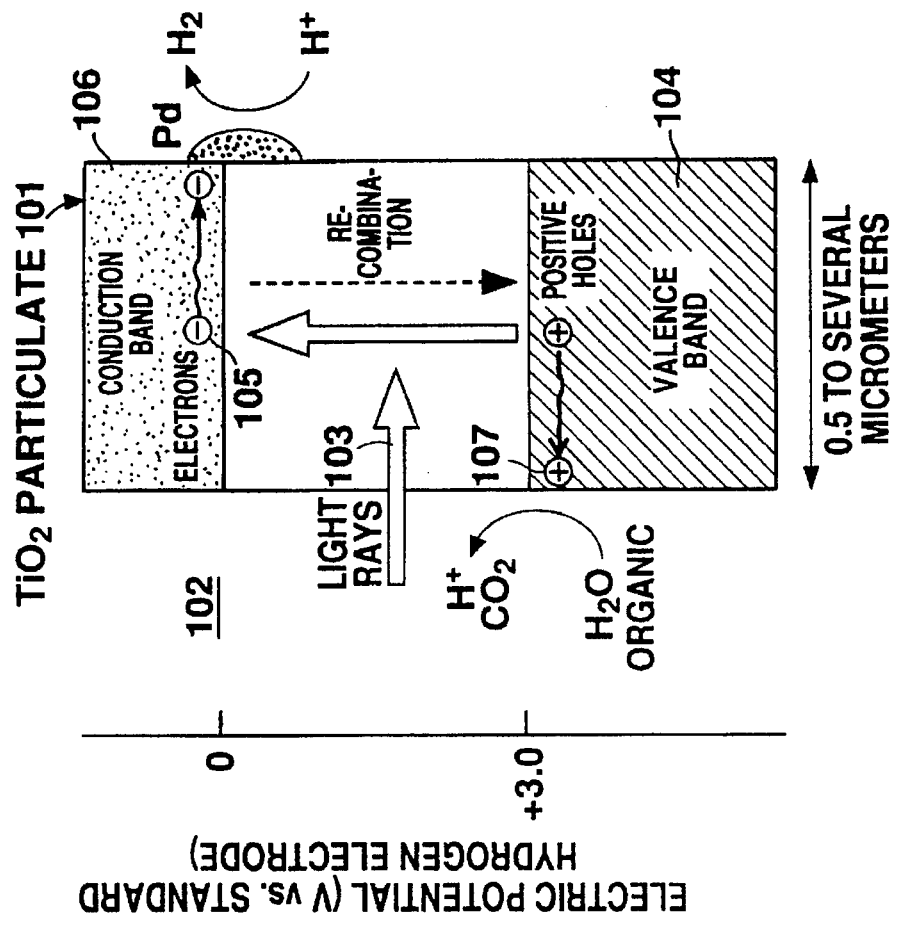
FIG. 1 illustrates a conventional hydrogen producing process using photocatalyst.
Figure 2:
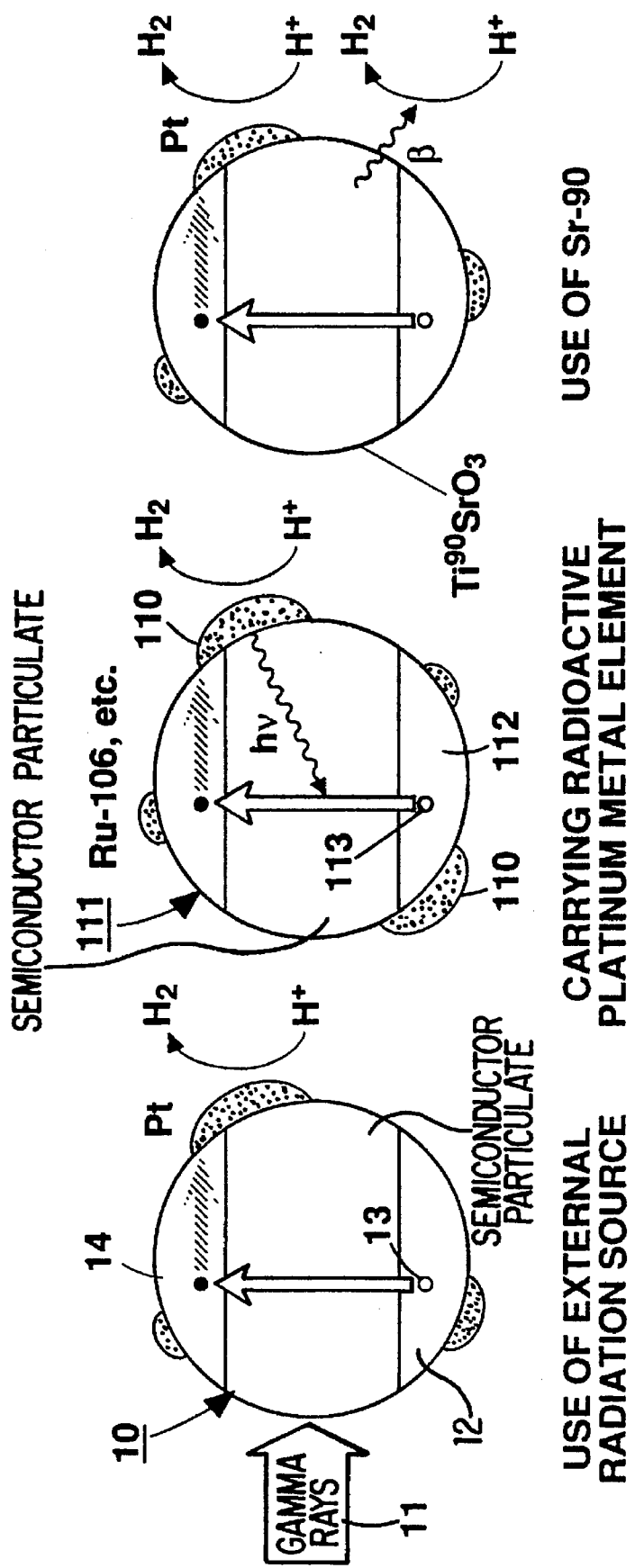
FIGS. 2A to 2C illustrate hydrogen producing processes using radiation.
Figure 3:
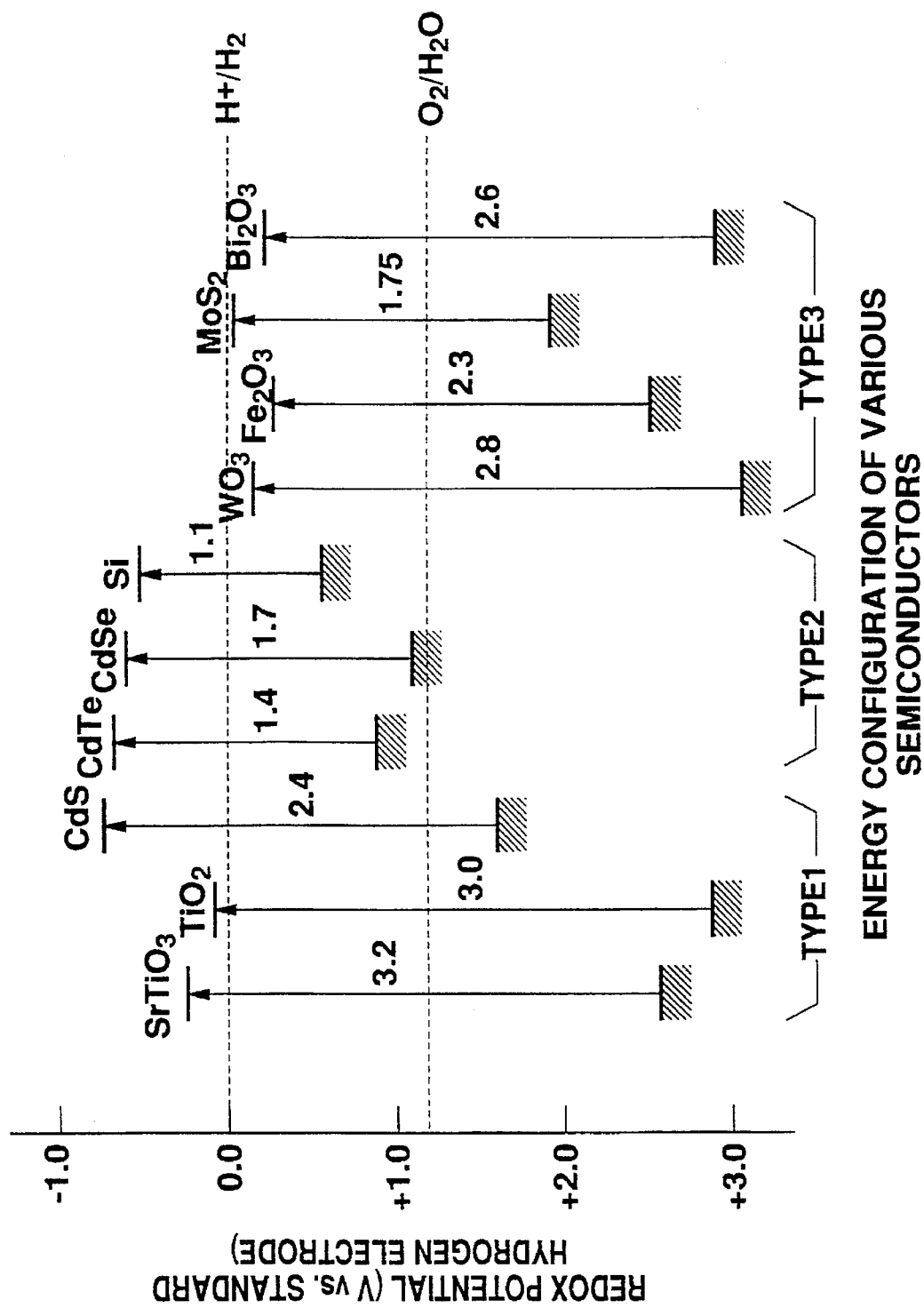
FIG. 3 is a diagram explaining energy gaps of semiconductors.

It should be appreciated that, as shown in FIG. 2C, the semiconductor particulate itself can contain a radioactive element of platinum group metal. In this type of hydrogen producing process, radiation energy existing within the semiconductor particulate is used for the hydrogen oxidation/reduction reaction.

What is claimed is:

1. A method for generating hydrogen, comprising:
    providing aqueous suspension containing catalyst particles comprising a platinum group metal carried on a semiconductor; and
    irradiating the suspension with gamma radiation to decompose water in the suspension.

2. The method as defined in claim 1, wherein said platinum group metal comprises at least one element selected from a group consisting of Ru, Rh and Pd.

3. The method as defined in claim 1, wherein said semiconductor has a redox potential covering potential from hydrogen to proton or from water to oxygen.

4. The method as defined in claim 3, wherein said semiconductor comprises at least one element selected from a group consisting of $TiO_2$, $SrTiO_3$ and CdS.

5. The method as defined in claim 1, wherein said suspension further contains an additive.

6. The method as defined in claim 5, wherein said additive is methanol.

\* \* \* \* \*